United States Patent
Colgan et al.

(10) Patent No.: US 6,529,189 B1
(45) Date of Patent: Mar. 4, 2003

(54) TOUCH SCREEN STYLUS WITH IR-COUPLED SELECTION BUTTONS

(75) Inventors: Evan George Colgan, Chester Ridge, NY (US); James Lewis Levine, Yorktown Heights, NY (US); Michael Alan Schappert, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,194

(22) Filed: Feb. 8, 2000

(51) Int. Cl.[7] .................................................. G09G 5/00
(52) U.S. Cl. ..................................... 345/179; 178/18.01
(58) Field of Search ................................ 345/173, 179, 345/145; 178/18.01, 18.07, 18.1, 19.03

(56) References Cited

U.S. PATENT DOCUMENTS

| | | | | |
|---|---|---|---|---|
| 4,430,526 A | * | 2/1984 | Brown et al. ................... | 178/18 |
| 4,672,154 A | * | 6/1987 | Rodgers et al. ................ | 178/19 |
| 4,787,051 A | * | 11/1988 | Olson .......................... | 345/179 |
| 4,814,552 A | | 3/1989 | Stefik et al. .................. | 178/18 |
| 5,051,736 A | * | 9/1991 | Bennett et al. ................ | 340/707 |
| 5,757,362 A | | 5/1998 | Levine ......................... | 345/166 |
| 5,959,617 A | * | 9/1999 | Bird et al. .................... | 345/182 |
| 6,130,666 A | * | 10/2000 | Persidsky ..................... | 345/179 |
| 6,151,015 A | * | 11/2000 | Badyal et al. ................. | 345/179 |
| 6,160,539 A | * | 12/2000 | Fleck .......................... | 345/173 |
| 6,188,392 B1 | * | 2/2001 | O'Conner et al. ............. | 345/179 |
| 6,229,601 B1 | * | 5/2001 | Hasegawa .................... | 356/141.5 |
| 6,292,181 B1 | * | 9/2001 | Banerjee et al. .............. | 345/179 |

OTHER PUBLICATIONS

EDN, Nov. 9, 1995, pp. 52–63, Richard A. Quinell, "Touch-screen Technology Improves and Extends its Options".
Machine Design, Apr. 9, 1993, pp. 48–53, Lawrence A. Berardinis, "Touch and Go".

* cited by examiner

*Primary Examiner*—Amare Mengistu
(74) *Attorney, Agent, or Firm*—Ohlandt, Greeley, Ruggiero & Perle, L.L.P.; Marian Underweiser

(57) ABSTRACT

The invention is embodied in a wireless stylus that incorporates, for example, an infrared emitter for communicating with a receiver associated with a computer. The stylus is provided with push-buttons near its tip that can be actuated by the user during the course of pointing the stylus at a touch screen location. Accordingly, by the combined actuation of the touch screen and a concurrent actuation of one or more of the push buttons, a mouse input to the computer is accomplished.

14 Claims, 2 Drawing Sheets

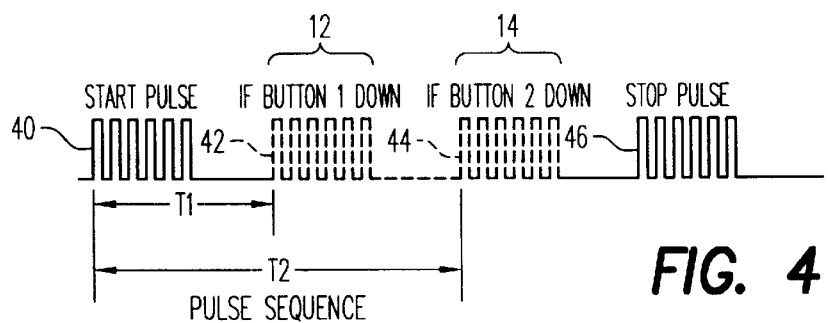
FIG. 4
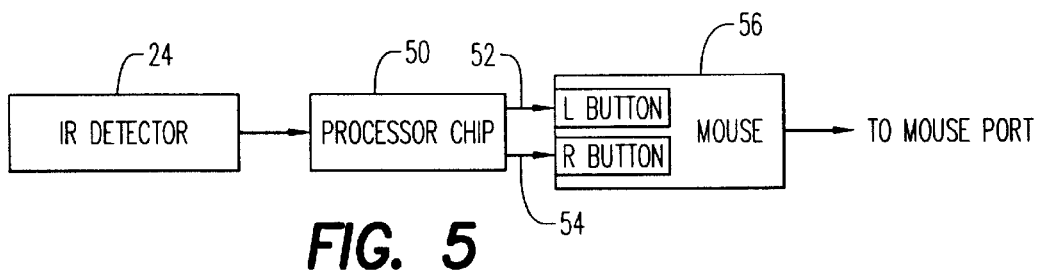
FIG. 5
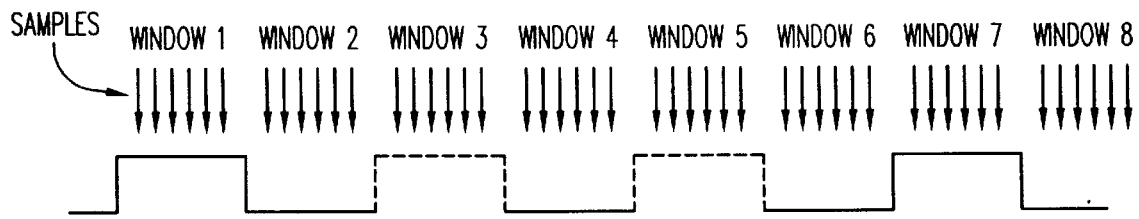
FIG. 6
FIG. 7
| WINDOW | VALUE |
|---|---|
| 1 | HIGH (START PULSE) |
| 2 | LOW |
| 3 | LEFT BUTTON STATE |
| 4 | LOW |
| 5 | RIGHT BUTTON STATE |
| 6 | LOW |
| 7 | HIGH (STOP PULSE) |
| 8 | LOW (END OF TRANSMISSION) |
TABLE 1: EXPECTED INPUT VALUES

TOUCH SCREEN STYLUS WITH IR-COUPLED SELECTION BUTTONS

FIELD OF THE INVENTION

This invention relates to input devices for computers and, more particularly, to a stylus type input device that incorporates means for inputting right and left mouse button control signals to a computer.

BACKGROUND OF THE INVENTION

Touch screens are widely used as input devices for computers and are broadly classified according to how they sense touches. Resistive matrix-touch screens typically comprise a transparent plastic membrane that overlays a glass substrate. Too and bottom layers are patterned with parallel metal wires that are perpendicularly aligned to form a grid. Pressing on the top membrane forces the wires together to register a touch.

Resistive analog touch screens are constructed like resistive matrix screens, but are not etched to define a wire grid. Instead, the entire surface acts as one large active area sensor. Touches are registered by measuring voltage dividers in the X and Y directions. Support circuits alternately apply voltage across bus bars on opposite sides of one layer (usually the bottom), first in the X direction and then in the Y direction. When the tap layer contacts the bottom, acts as a probe and measures the X and Y voltage components. These values define the location of the touch point.

In the past, resistive membrane touch screens have been most often used for dedicated applications, such as public access kiosks or manufacturing process control, where the basic interaction is selection from a small set of icons or other targets. In this case, it is sufficient to select an icon as soon as it is touched, or perhaps touched and released. A typical software strategy is for the touch screen device driver to interact with the normal mouse device driver to generate emulated mouse button changes, in accordance with the state of the screen contact. Usually, several emulation options are provided. This is generally satisfactory for a dedicated program, especially if the underlying operating system is hidden from the user.

Now, however, resistive screens, often equipped with a stylus, are increasingly being installed in general purpose computers. For this case, both the operating system and most standard application programs are designed to be controlled by a two-button mouse input device. In such configurations, it is difficult to provide a consistent and intuitive mouse button emulation that allows the touch screen to be used in place of a mouse or other pointing device. As an example, most operations require an ability to drag a cursor to some particular place, and then to start an operation, either by clicking a button (e.g., for a selection of a menu item), or by depressing it and holding a button (e.g., a window drag).

Most of these operations fail if the button is pressed before the cursor is properly positioned. It is then difficult to emulate the left button, using only the touch screen contact signal, without resorting to awkward procedures. For example, one such procedure is to emulate a left-button actuation if no motion occurs after one second. Such a gesture technique is hard to use reliably. The Windows operating system (Windows is a registered trademark of the Microsoft Corporation) also uses the right button, for example, to open special menus. This action can be emulated by more complex procedures involving multiple taps and/or gestures. In addition to being awkward, such procedures may be misinterpreted and cause unintended effects.

Lastly, special difficulties arise when a stylus is used for handwritten inputs. Here it is essential to use the contact signal to segment the handwriting rather than for mouse button emulation.

The prior art, for example, U.S. Pat. No. 4,814,552 to Stefik et al. employees a stylus system using both ultrasonic and infrared transducers. The transducers are used in combination to determine stylus tip location by timing the arrival of ultrasonic signals from the stylus. In addition, the infrared transducers are used to transmit to an associated computer the state of a stylus contact switch and two push buttons.

The use of a wireless link to transmit the button state is essential, as a stylus with connecting wires is clumsy to use. It is preferable, however, to sense position with a resistive touch screen, as such screens are the dominant technology for flat panel displays. As such, they are available at low cost, can be used with fingers as well as with styli, and provide an inherent contact signal with negligible displacement so that the computer can segment handwriting into strokes. In contrast, stylus contact switches often require significant longitudinal displacement for actuation. This can produce segmentation artifacts when used for handwriting, for example noticeable "hooks" at the end of some strokes.

A further problem with the prior art is that it does not deal with a situation which can arise if the stylus is withdrawn from sensing range at a time when a pushbutton is depressed. The button will then appear to be pressed even if it is later released. This will effectively disable the operating system and/or application programs unless some provision is made to reset the button state.

Accordingly, it is an object of this invention to provide a stylus input device with the capability to input right and left mouse button signals.

It is another object of this invention to provide a stylus, having no direct wire connection to the computer, with an ability to input right and left mouse button control input signals.

It is yet another object of this invention to provide a stylus, having no direct wire connection to a computer, with an ability to input at least one button control signal to the computer, and to clear the signal in the event that the wireless link fails while a button is actuated.

SUMMARY OF THE INVENTION

The invention is embodied in a wireless stylus that incorporates, for example, an infrared emitter for communicating with a receiver associated with a computer. The stylus is provided with push-buttons near its tip that can be actuated by the user when the stylus is in the range of a wireless detection sensor. Accordingly, by the combined actuation of the touch screen and a concurrent actuation of one or more of the push buttons, a mouse input to the computer is accomplished.

BRIEF DESCRIPTION OF THE DRAWINGS

FIG. 4 illustrates the waveforms generated by the circuit of FIG. 3.

FIG. 5 is a high level block diagram of an infrared detection module and processor chip used to detect signals from the stylus of FIG. 1.

FIG. 6 is a waveform diagram illustrating sampling actions that occur to detect the presence of pulse signals that indicate button actuations.

FIG. 7 is a chart illustrating logic states that, are assumed upon finding a pulse in a window time during the sampling sequence shown in FIG. 6.

DETAILED DESCRIPTION OF THE PREFERRED EMBODIMENT

Figure 1:
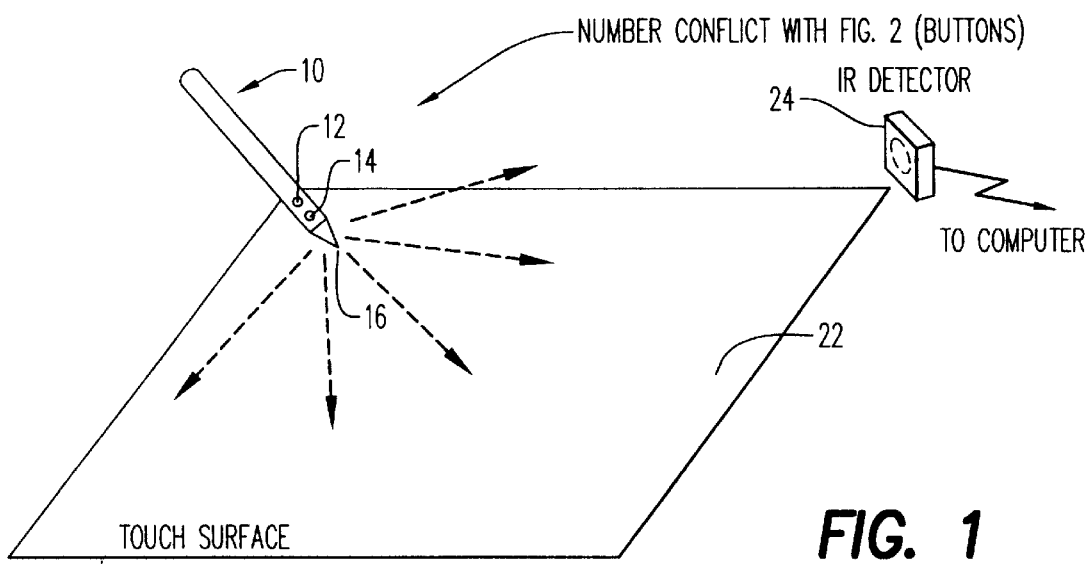
FIG. 1 is a schematic view of an overall arrangement of the invention.
Figure 2:
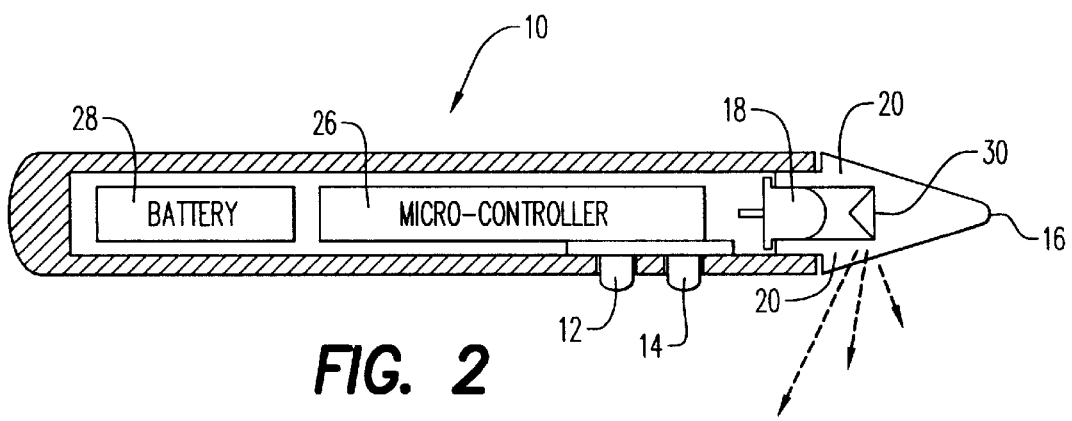
FIG. 2 is a schematic sectional view of the stylus of FIG. 1 that incorporates the invention.

Referring to FIGS. 1 and 2, stylus 10 is provided with buttons 12 and 14 close to tip 16. While two buttons are shown, more may be incorporated in stylus 10. Within stylus 10 is found an infrared light emitting diode 18 (shown in FIG. 2) that is caused to emit encoded modulated infrared light from a transparent section 20 located near tip 16. Stylus 10 is positioned over a touch screen 22 and, when pressed thereagainst, causes touch screen 22 to indicate to an attached computer (not shown) the location of tip 16. Also coupled to the computer is an infrared detection module 24, preferably located near an upper corner of the processor's display, that receives the transmitted infrared signals, causes them to be decoded by a small incorporated processor, and passes the decoded signals to the computer as mouse button inputs.

Stylus 10 is shown in more detail in FIG. 2 where buttons 12 and 14 are indicated as being positioned close to tip 16. Push buttons 12 and 14 are connected to a microcontroller 26 that is, in turn, powered by a battery 28. Microcontroller 26 is normally in a "sleep" mode and in this state draws only a few microamps from battery 28. Microcontroller 26 is caused to automatically exit its sleep mode when one of buttons 12 or 14 is depressed or released. It then pulses light emitting diode (LED) 18, via an output pin, to indicate the new button state.

When LED 18 is pulsed, it emits light towards a reflector cone 30 that is positioned within stylus 10. As a result, the light pulses emanating from LED 18 are reflected outwardly through transparent portions 20 towards detection module 24 (FIG. 1).

Figure 3:
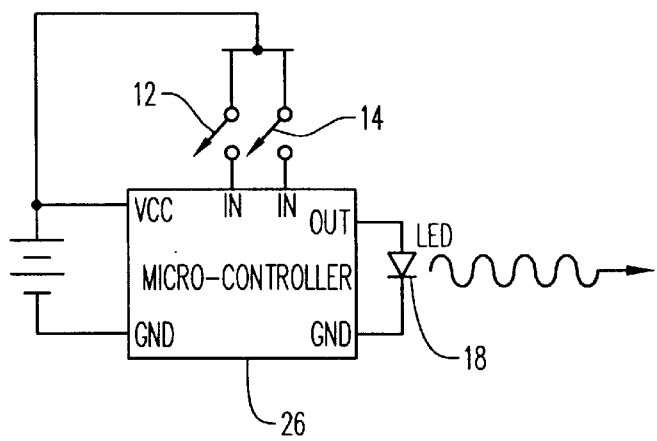
FIG. 3 is a high-level schematic of a circuit that generates an infrared pulse signal sequence.

FIG. 3 is a high level schematic illustrating the LED drive circuit. Each transmission from microcontroller 26 comprises one or more pulses, each pulse comprising a burst of sub-pulses having a repetition rate frequency of, for example, 36 kiloHertz. The complete pulse sequence comprises a start pulse 40 (see FIG. 4) followed, after a delay T1, by pulse 42 if button 12 is actuated and/or a pulse 44, after delay T2, if button 14 is actuated. Thereafter, a stop pulse 46 signals the end of the sequence. The sequence is repeated once, after a delay, to increase the probability of detection by detection module 24.

After emitting the second pulse sequence, microcontroller 26 is returned to the sleep mode, with a wake-up timer now set to a predetermined time value. Upon time out of the wake up timer, microcontroller 26 awakens and checks the button states, emitting a regular pulse sequence if either of buttons 12 or 14 is still depressed. It then returns to the sleep mode. Thus, with one of buttons 12 or 14 down, stylus 10 is caused to re-emit the pulse sequence at the expiration of each sleep time.

The processor in detection module 24 is programmed to reset its "button-actuated state" if it fails to detect a predetermined number (e.g., one or two) of these periodic pulse sequences. Without this mode of operation, if the user removes stylus 10 from the detection range of module 24, with one of buttons 12 or 14 depressed, detection module 24 would assume that one of the buttons was still in the actuated state, even if released, thereby resulting in a disabling of the system. Thus, the system maintains its state of operation, even though the user may have removed stylus 10 from the detection range with one of buttons 12 or 14 depressed.

In addition to the use of sleep mode, power consumption from battery 28 is reduced by the use of reflector cone 30, which reflects the infrared light emitted by LED 18. Cone 30 is used, in conjunction with the angular spread of the LED emission, to direct the infrared light into a useful direction, i.e. towards the infrared receiver. That is, the included angle of reflector cone 30 is chosen to deflect the infrared light generally into a plane parallel to the surface of touch screen 22 when stylus 10 is held at a normal writing angle of about 45 degrees to the surface of touch screen 22. The angular spread of the LED emission provides the necessary tolerance in stylus writing angle. By this means, an LED 18 with a relatively narrow angular spread can be used. As an example, if the LED emission falls to half power at an angle of 40 degrees from the axis, then an included cone angle of about 65 degrees is suitable and will result in a theoretical tilt tolerance of about +/−20 degrees. In practice, the tolerance will be greater because internal reflection of the infrared light will broaden the emission pattern.

Referring to FIG. 5, detector module 24 includes a lensed IR detector 24 that comprises a gain controlled amplifier tuned to the center frequency of the emitted subpulses, an AC to DC converter, a filter and a voltage comparator. Exemplary modules are the SFH 5110 or SFH 5111 series manufactured by Infineon Technologies AG. The lens, which also serves as a narrow band infrared filter, has a wide acceptance angle (e.g., +/−55°).

The output from IR detector 24 is a logic level signal which tracks the envelope of the infrared transmissions, apart from a short, fixed delay. These pulses are fed to a processor chip 50 for decoding. Processor chip 50 checks the timing and number of logic level transitions to ensure that the signal is valid, in order to reject IR interference from other transmitters. It then determines which, if any, of the extra pulses shown in FIG. 4 are present in order to detect button state. Two processor output pins 52, 54 are connected across mouse button input pins of a standard mouse processor chip 56 which is, in turn, connected to a regular mouseport of a computer. A low voltage across a button switch appears to mouse 56 as a contact closure. Mouse 56 automatically transmits all such changes to the computer where they are interpreted as button changes. While the aforementioned is one way to interface processor chip 50 to a computer, there are other ways to accomplish the interface action. For example, interface processor chip 50 may be directly connected to the touch screen processor or to the computer's serial port.

Turning now to FIGS. 6 and 7, the algorithm used to enable detection of signals from stylus 10 will be described using a stylus with two buttons, as an example. The expected signal is a set of two to four pulses, depending on the button state. Additional buttons may be accommodated by adding and detecting additional pulses. The detection algorithm is designed to test the waveform for validity by checking for the correct number and spacing of edge transitions of the pulses, while tolerating normal timing variations. Initially, processor chip 50 runs in a loop, checking the output pin voltage from detector 24 for a positive going edge. Such a positive going edge is assumed to mark the start of transmission, consisting of a start pulse 40, two button state pulses (42, 44) followed by a stop pulse 46. Processor 50 then executes an algorithm which checks for a valid start pulse 40, two possible button pulses and a stop pulse. In addition, the intervals after the pulse locations are checked for 0 values (see the table of FIG. 7). Each check is done by sampling. the input signal as rapidly as possible. The sampling is done within a window inside of each expected region, chosen to allow for normal. timing variations.

All samples within each window are required to have the same value, i.e., there should be no unexpected transitions. This state is checked, and an error flag is set if any transitions occur within a sampling window. Similarly, if the value within each sampling window differs from an expected value, such as shown in the. table of FIG. 7, the error flag is set. If the error flag is clear at the end of the entire sequence, then the button states are taken from the bit values of the third and fifth sampling intervals.

Processor chip 50 then sets two output bits to reflect the button state. As discussed above, processor 50 also checks for repeated sequences at the time-out of a sleep state counter (e.g., 150 milliseconds). If the last detected signal state indicated a button-actuated condition, the processor clears the button state if a new pulse sequence is missing.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A stylus system for enabling dispatch of control signals to a computer that is duplicative of a mouse button actuation, said stylus system comprising:

a stylus having a pointer end for actuation of a touch panel;

a controller housed in said stylus for transmitting said control signals through air; and a user-operable actuator positioned on said stylus, connected to said controller and responsive to user actuation to cause said controller to dispatch said control signals, wherein said control signals are interpretable as a mouse output signal, wherein said controller comprises an infrared transmitter for transmitting said control signals, and said computer comprises an infrared receiver for receiving and decoding said control signals, wherein said pointer end includes a portion that is transparent to infrared signals and an infrared reflector, wherein said infrared transmitter comprises a light emitting diode that emits light towards said infrared reflector that, in turn, redirects said light to said infrared receiver when a user holds said stylus against said touch panel, and wherein said controller, after a first dispatch of a set of said control signals in response to depression of said actuator and a delay, automatically re-dispatches said set of control signals, said infrared receiver responsive to control signals received as a result of said first dispatch, to set a flag indicative of said depression, and further operative, after an interval, to reset said flag upon absence of receipt of said set of control signals from said re-dispatch.

2. The stylus system as recited in claim 1, wherein said infra-red receiver after receiving and decoding said control signals, feeds decoded signal levels to a mouse input of said computer.

3. The stylus system of claim 1, wherein said touch panel comprises a resistive membrane.

4. A stylus system for enabling dispatch of control signals to a computer that are duplicative of mouse button actuations, said stylus system comprising:

a stylus having a pointer end for actuation of a touch panel;

a controller housed in said stylus for transmitting said control signals through air; and a user-operable actuator positioned on said stylus, connected to said controller and responsive to user actuation to cause said controller to dispatch said control signals, wherein said user-operable actuator comprises a first actuator and a second actuator, user actuation of: (i) said first actuator causing said controller to dispatch a control signal that is interpretable as a first mouse output signal and (ii) said second actuator causing said controller to dispatch a control signal that is interpretable as a second mouse output signal.

5. The stylus system as recited in claim 4, wherein said controller, responds to a depression of (i) said first actuator to transmit a control signal comprising a first pulse followed by a second pulse a time T1 later or (ii) said second actuator to transmit a control signal comprising said first pulse followed by a third pulse a time T2 later, wherein T2>T1.

6. The stylus system of claim 4, wherein said touch panel comprises a resistive membrane.

7. A pointing system for enabling dispatch of a control signal through air to a computer that is duplicative of a push button actuation, said system comprising:

a manually held stylus for selection of position in at least one dimension, said stylus having a pointer end for actuation of a touch panel, and a member for directing a transmission signal, omni-directionally, in a plane that is generally parallel to a surface of said touch panel;

a controller housed in said stylus having a transmitter for transmitting said control signal via said member; and a user activated button on said stylus for causing said controller to dispatch said control signal, wherein said user-activated button comprises a first actuator and a second actuator, user actuation of: (i) said first actuator causing said controller to dispatch a control signal that is interpretable as a first mouse output signal and (ii) said second actuator causing said controller to dispatch a control signal that is interpretable as a second mouse output signal.

8. The stylus system recited in claim 7, in which button actuation comprises making an electrical contact by mechanical displacement.

9. The stylus system recited in claim 7, wherein said button actuates a force-to-voltage transducer.

10. The stylus system recited in claim 7, wherein said transmitter comprises an infrared emitter.

11. The stylus system recited in claim 7, wherein said transmitter comprises a radio frequency emitter.

12. The stylus system recited in claim 7, wherein said transmitter comprises an ultrasonic emitter.

13. The stylus system of claim 7, wherein said touch panel comprises a resistive membrane.

14. The stylus system of claim 7, wherein said member comprises an infrared reflector situated within said pointer end, wherein said pointer end includes a portion that is transparent to infrared signals, and wherein said transmitter emits infrared light towards said infrared reflector, which in turn directs said infrared light to said plane.

* * * * *